US012287676B2

(12) United States Patent
Merrell et al.

(10) Patent No.: US 12,287,676 B2
(45) Date of Patent: Apr. 29, 2025

(54) ROLLABLE SCREEN DEVICE WITH PIEZOELECTRIC SENSING

(71) Applicant: Motorola Mobility LLC, Chicago, IL (US)

(72) Inventors: Thomas Yates Merrell, St Charles, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/472,577

(22) Filed: Sep. 22, 2023

(65) Prior Publication Data
US 2025/0103100 A1 Mar. 27, 2025

(51) Int. Cl.
*G06F 3/00* (2006.01)
*G06F 1/16* (2006.01)
*G06F 3/01* (2006.01)

(52) U.S. Cl.
CPC ............ *G06F 1/1652* (2013.01); *G06F 3/016* (2013.01)

(58) Field of Classification Search
CPC .... G06F 1/1624; G06F 1/1652; G06F 1/1656; G06F 1/1677; G06F 1/1681; G06F 1/1684; G06F 1/1686; H04M 1/0239; H04M 1/0264; H04M 1/0268
See application file for complete search history.

(56) References Cited

U.S. PATENT DOCUMENTS

| 8,878,788 | B2 | 11/2014 | Zurek et al. |
| 11,838,433 | B1 | 12/2023 | Kumar Agrawal et al. |
| 12,260,021 | B1 | 3/2025 | Merrell et al. |
| 2001/0007449 | A1 | 7/2001 | Kobachi et al. |
| 2011/0254672 | A1 | 10/2011 | Ciesla et al. |
| 2014/0218330 | A1 | 8/2014 | Ady |
| 2014/0267139 | A1 | 9/2014 | Slaby |
| 2016/0103488 | A1 | 4/2016 | Levesque et al. |
| 2016/0202781 | A1* | 7/2016 | Kim ........................ H05K 1/028 345/173 |
| 2019/0011988 | A1 | 1/2019 | Khoshkava |
| 2019/0261519 | A1 | 8/2019 | Park et al. |
| 2022/0124188 | A1 | 4/2022 | Song et al. |
| 2023/0017380 | A1 | 1/2023 | Kim et al. |
| 2023/0280874 | A1 | 9/2023 | Han et al. |

OTHER PUBLICATIONS

"OPPO X 2021 Rollable Concept Handset, Unroll the Infinite", OPPO [retrieved Jul. 21, 2023]. Retrieved from the Internet <https://www.oppo.com/en/smartphones/oppo-x-2021/>., 31 Pages.

(Continued)

*Primary Examiner* — Insa Sadio
(74) *Attorney, Agent, or Firm* — FIG. 1 Patents

(57) ABSTRACT

In aspects of rollable screen device with piezoelectric sensing, a mobile device includes a rollable display screen configurable in one of multiple display states corresponding to respective device form factors. The mobile device has one or more piezoelectric sensors that detect forces applied to the rollable display screen of the mobile device. The mobile device implements a selection manager that activates one or more parameters (e.g., volume, call acceptance, call decline) of the mobile device based on the forces detected by the one or more piezoelectric sensors.

20 Claims, 10 Drawing Sheets

(56) References Cited

OTHER PUBLICATIONS

Agrawal, Amit Kumar, et al., "Pursuant to MPEP § 2001.06(b) the applicant brings the following co-pending application to the Examiner's attention:", U.S. Appl. No. 18/364,341, filed Aug. 2, 2023, 39 pages.
Porter, Jon, "Oppo's rollable concept phone is pure potential lacking polish", Vox Media, LLC [retrieved Jul. 21, 2023]. Retrieved from the Internet <https://www.theverge.com/2021/6/16/22536363/oppo-x-2021-rollable-smartphone-demonstration-features>., Jun. 16, 2021, 29 Pages.
U.S. Appl. No. 18/472,562, "Non-Final Office Action", U.S. Appl. No. 18/472,562, Aug. 15, 2024, 12 pages.
"Corrected Notice of Allowability", U.S. Appl. No. 18/472,562, filed Feb. 12, 2025, 2 pages.
"Notice of Allowance", U.S. Appl. No. 18/472,562, filed Jan. 23, 2025, 7 pages.

\* cited by examiner

ROLLABLE SCREEN DEVICE WITH PIEZOELECTRIC SENSING

BACKGROUND

Devices such as smart devices, mobile devices (e.g., cellular phones, tablet devices, smartphones), consumer electronics, and the like can be implemented for use in a wide range of environments and for a variety of different applications. Generally, mobile devices come in varying sizes and form factors, such as rectangular with an overall rigid shape, foldable devices with a housing that is hinged allowing a device to fold, and slidable devices with housing sections that slide apart and back together. Consumers typically want smaller devices that are convenient to carry, yet also prefer devices that have some expandability for larger display viewing, such as with the foldable and slidable devices. However, providing a user with control over various device parameters (e.g., volume, call rejection and acceptance, brightness, fast forward, rewind, and so on) of smaller and/or adjustable devices is challenging. Smaller devices inherently provide less space for push buttons or other controls for managing such parameters. Moreover, expandable devices often include hardware that can interfere with the position of device controls.

BRIEF DESCRIPTION OF THE DRAWINGS

Implementations of the techniques for rollable screen devices with piezoelectric sensing are described with reference to the following Figures. The same numbers may be used throughout to reference like features and components shown in the Figures.

DETAILED DESCRIPTION

Figure 1:
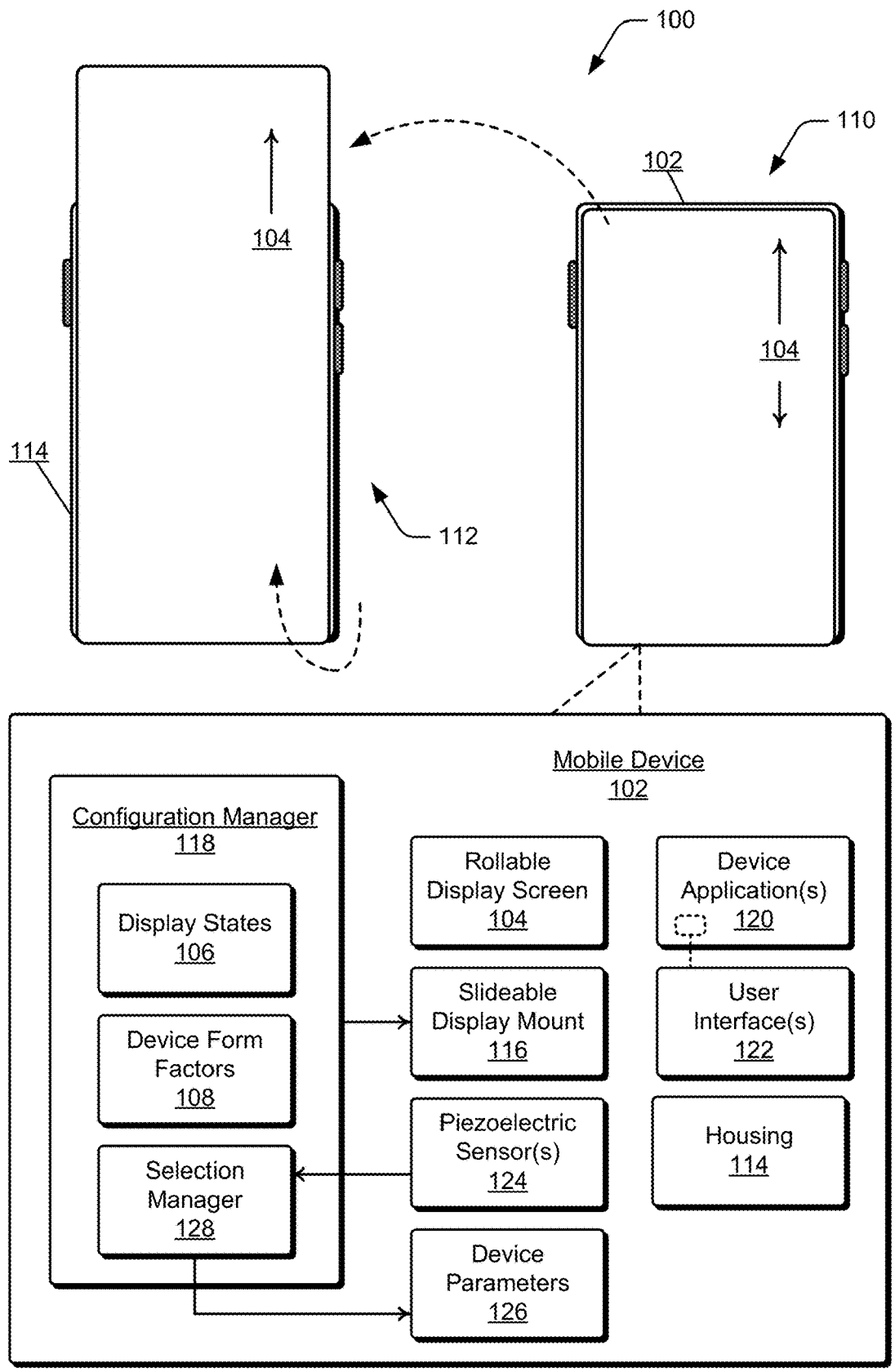
FIG. 1 illustrates an example system for a rollable screen device with piezoelectric sensing in accordance with one or more implementations as described herein.

Implementations of techniques for employing one or more piezoelectric sensors in a rollable screen device are described herein, and the techniques apply to any device that is configurable in at least two form factors, such as any type of extendable device or foldable device (e.g., a flip-phone), either of which can change form factors automatically, or manually by a user of the device. A rollable screen device, such as a mobile device (e.g., any type of mobile phone, wireless device, and/or electronic device) is expandable with the rollable display screen that is configurable in one of multiple display states corresponding to respective device form factors. Aspects of the techniques described in this disclosure employ one or more piezoelectric sensors to enhance the control of device parameters (e.g., volume, call rejection and acceptance, display brightness, fast forward, rewind, and so on) of the device and/or application functions. Additionally, or alternatively, the described techniques employ one or more piezoelectric sensors to provide feedback relative to the control of such parameters.

Devices having viewable display screens will generally include one or more components such as push-buttons, touchscreens, and the like to aid in controlling device and/or application parameters (e.g., volume, display brightness, and the like) of the device. Larger devices provide significant space and a multitude of locations suitable for integrating such components. However, users often appreciate smaller devices, particularly if the device is designed to travel with the user, such as a smartphone, tablet, or the like. The space and number of locations for control components on smaller devices is more limited thereby complicating the design of these devices. Further complicating the design of such devices, it has been found that most users want their smaller devices to provide larger screens when those devices are being used. Consequently, manufacturers have designed devices to be adjustable to have a compact form and an expanded form where the expanded form of the device provides greater screen space. Unfortunately, providing parameter controls for such devices can be particularly problematic since space and locations for such controls is limited and the controls themselves can be incompatible with the adjustable nature of the devices.

In aspects of the rollable screen device with piezoelectric sensing, a mobile device is configured with one or more piezoelectric sensors for sensing one or more forces applied to a screen of the mobile device. Advantageously, the piezoelectric sensors can be disposed at a variety of different locations of the mobile device as long as the sensors can sense the forces applied to the display screen. In this way, the piezoelectric sensors can provide a user with desired control over parameters of the mobile device while avoiding the use of additional push-buttons or other selectable controls that can be more cumbersome for the mobile device design.

As suggested, the piezoelectric sensors can be located at a variety of different locations on the mobile device. As one example, the piezoelectric sensors can be located on (e.g., attached to) a housing of a mobile device. As an additional or alternative example, the piezoelectric sensors can be integrated with (e.g., disposed on, under, or proximate) the display screen of the mobile device. As a further additional or alternative example, the piezoelectric sensors can be located on mechanical components of the mobile device that aid in adjusting the device between form factors. In conjunction with the disclosure herein, the skilled artisan will be able to identify other locations suitable for the piezoelectric sensors in the systems, devices, and methods disclosed herein.

In an implementation of the rollable screen device with piezoelectric sensing, one or more piezoelectric sensors are positioned such that the screen "floats" relative to the piezoelectric sensors. As used herein, "floating" of the screen relative to a piezoelectric sensor means that the display screen, a piezoelectric sensor, or both are positioned relative to each other such that the display screen is within a distance from the piezoelectric sensor that is less than approximately two millimeters (2 mm), more typically less than one (1) mm, still more typically less than one-half (0.5) mm, and even more typically less than one-quarter (0.25) mm. In this way, a force can be applied to move a portion of the display screen such that the screen (e.g., an edge or backside of the screen) contacts and deflects the piezoelectric sensor. In this configuration, or in any other configuration of the display screen and piezoelectric sensors, it is desirable that movement of the screen be limited in a manner that deflection of the piezoelectric sensors is also limited to avoid damaging the piezoelectric sensors. It is contemplated that the piezoelectric sensors may be positioned to sense movement of the display screen along a single axis or multiple axes. In either situation, it is desirable to limit movement along any axis where that movement causes deflection of a piezoelectric sensor.

As noted, the techniques described herein apply to any device that is configurable in at least two form factors. The display screen of such a device is typically moveable relative to a housing of the device (e.g., a rollable display screen as described in this disclosure). Such movement can provide additional usable screen space or, additionally or alternatively, can provide improved access to the screen. For example, a rollable display screen might be able to increase the usable screen space of the device, whereas a flip phone might provide access to a display screen that was not previously accessible. By using the display screen in conjunction with the one or more piezoelectric sensors, the screen itself can be employed to help control parameters of the mobile device. As used herein, the terms screen and display screen, unless otherwise specifically stated, are meant to be interpreted broadly to include visible and hidden portions of the screen as wells as the framing and housing of the display screen of a device. Thus, the display screen is meant to include those portions of the screen that provide viewable content as well as the edges and housing that frame, support, or otherwise move with the portion of the screen that provides viewable content.

Notably, a rollable display screen in an expanded form provides a portion of a display screen that is extended away from a housing of a device, thereby providing improved access to that portion of the screen. Similarly, for a flip device (e.g., a flip phone), a screen is "flipped' away from a housing of the device to achieve its expanded form thereby providing improved access to that screen or portion of the screen. In such implementations, it is often easier for an individual to apply forces on the display screens of those devices. For example, a user may apply one or more forces to one or more edges and/or surfaces of the display screen and such forces can then be sensed by the one or more piezoelectric sensors for controlling one or more device parameters of the device and/or for providing feedback to the user that the one or more applied forces were successfully sensed.

While features and concepts of the described techniques for rollable screen device with piezoelectric sensing can be implemented in any number of different devices, systems, environments, and/or configurations, implementations of the techniques for rollable screen device with piezoelectric sensing are described in the context of the following example devices, systems, and methods.

FIG. 1 illustrates an example system 100 for rollable screen device with piezoelectric sensing, as described herein. The example system 100 includes a mobile device 102, such as a smartphone, mobile phone, wireless device, and/or any other type of wireless device. The mobile device 102 can be implemented with various components, such as a processor system and memory, as well as any number and combination of different components as further described with reference to the example device shown in FIG. 10. In implementations, the mobile device 102 includes various radios for wireless communication with other devices. For example, the mobile device 102 may include a Bluetooth (BT) and/or Bluetooth Low Energy (BLE) transceiver and/or a near field communication (NFC) transceiver. The mobile device 102 may also include a Wi-Fi radio, a GPS radio, and/or any type of device communication interfaces.

The mobile device 102 has a rollable display screen 104 that can be configured in any one of various display states 106 corresponding to respective mobile device form factors 108. For example, the device form factors 108 can include a compact form factor, an expanded form factor, a partial form factor (also referred to as a "peek" form factor), as well as other device form factors. The rollable display screen 104 may be positioned in any incremental display state 106 corresponding to device form factors between the compact form factor and the expanded form factor of the device. In this example system 100, the mobile device 102 is shown in the compact form factor at 110, with the rollable display screen 104 configured in a retracted display state that corresponds to the compact form factor of the device. Further, the mobile device 102 is shown in the expanded form factor at 112, with the rollable display screen 104 configured in an extended display state. The rollable display screen 104 is a flexible display that translates between the retracted display state to the extended display state, and back. In one or more implementations, the rollable display screen 104 is an organic light emitting diode (OLED) display fabricated on a flexible plastic substrate, which allows the flexible display to deform around a device housing 114.

The mobile device 102 includes a slidable display mount 116 that is a powered sliding or translation mechanism (e.g., an actuator, motor, gear assembly, drive screws, etc.) operable to transition the rollable display screen 104 around the surfaces of the device housing 114, such as between the extended display state where the rollable display screen 104 extends distally from the device housing 114, and the retracted display state where the rollable display screen 104 corresponds to the compact form factor of the device with the flexible display wrapping around the surfaces of the device housing 114. In one or more implementations, the rollable display screen 104 may be extended or retracted automatically, such as based on whether content is being displayed on the display screen for viewing, a size of the displayed content, and/or based on the type of displayed content. For example, a user may prefer the mobile device 102 in the compact form factor as shown at 110 for ease of carrying, and then when initiating to playback content for viewing, the rollable display screen 104 automatically extends from the retracted display state to the extended display state for full-screen viewing, as shown at 112 in the expanded form factor of the device.

The mobile device 102 includes various functionality that enables the mobile device to implement different aspects of a rollable screen device with piezoelectric sensing, as described herein. In this example system 100, the mobile device 102 includes a configuration manager 118 that represents functionality (e.g., logic, software, and/or hardware) enabling the automatic function control of the slidable display mount 116 for translating and positioning the rollable display screen 104. The configuration manager 118 can be implemented as computer instructions stored on computer-readable storage media (e.g., memory of the device), or in any other suitable memory device or electronic data storage, and can be executed by a processor system of the device. Alternatively, or in addition, the configuration manager 118 can be implemented at least partially in firmware and/or at least partially in computer hardware. For example, at least part of the configuration manager 118 may be executable by a computer processor, and/or at least part of the configuration manager may be implemented in logic circuitry. In one or more implementations, the configuration manager 118 may include independent processing, memory, and/or logic components functioning as a computing and/or electronic device integrated with the mobile device 102.

The mobile device 102 can include and implement various device applications 120, such as any type of messaging application, email application, video communication application, cellular communication application, music application, gaming application, media application, social platform applications, and/or any other of the many possible types of device applications. Many of the device applications 120 have an associated application user interface 122 that is generated and displayed for user interaction and viewing, such as on the rollable display screen 104 of the mobile device 102. Generally, an application user interface, or any other type of video, image, graphic, viewable content, and the like is digital image content that is displayable on the rollable display screen 104 of the mobile device. In this example system 100, the configuration manager 118 can be implemented as a software application or module, such as executable software instructions that are executable with a processor system of the mobile device 102 to implement the techniques and features described herein. As a device application, the configuration manager 118 may have an associated application user interface 122 that is generated and displayable for user interaction and viewing, such as on the rollable display screen 104 of the mobile device.

In aspects of the techniques described herein for a rollable screen device with piezoelectric sensing, the mobile device 102 includes one or more piezoelectric sensors 124 that sense one or more forces applied to the display screen. The piezoelectric sensors may be located in a variety of locations on or about the device. One or more piezoelectric sensors may be connected to the housing 114, the display screen 104, or other components of the mobile device 102 with the rollable screen device. The piezoelectric sensors 124 can be selected from a variety of types of sensors and can be formed of a variety of types of piezoelectric materials. Generally, a piezoelectric sensor 124 is any sensor that uses the piezoelectric effect to produce an electrical charge based on a piezoelectric material being subjected to a force, pressure, strain, or the like. Examples of types of sensors include, without limitation, a piezoelectric pressure pad, a piezoelectric film, and a piezoelectric disc. Examples of piezoelectric materials suitable for the piezoelectric sensors include, without limitation, piezoelectric ceramics, single crystal piezoelectric materials, and thin film piezoelectric materials. Examples of specific piezoelectric materials include, without limitation, gallium phosphate, quartz, and tourmaline.

In operation, the piezoelectric sensors 124 sense (e.g., also referred to herein as the piezoelectric sensors detect) one or more forces applied to the display screen 104 and activate one or more device parameters 126 of the device based on the one or more applied forces that are sensed or detected. Examples of the device parameters 126 of the device include, without limitation, volume, turning the device on or off, call acceptance, call rejection, call end, call initiation, take a picture, open an application, close an application, and so on. As used herein, activating a device parameter means that an activity of that parameter is initiated. Such activity can include turning a parameter on or off, enhancing or attenuating a parameter, or otherwise.

The activity of such device parameters 126 can be initiated with a selection manager 128 implemented in the mobile device 102. The selection manager 128 represents functionality (e.g., logic, software, and/or hardware) enabling the automatic function control of the various device parameters 126 of the mobile device 102 upon receipt of signals from the piezoelectric sensors. The selection manager 128 can be implemented as computer instructions stored on computer-readable storage media (e.g., memory of the device), or in any other suitable memory device or electronic data storage, and can be executed by a processor system of the device. Alternatively, or additionally, the selection manager 128 can be implemented at least partially in firmware and/or at least partially in computer hardware. For example, at least part of the selection manager 128 may be executable by a computer processor, and/or at least part of the selection manager may be implemented in logic circuitry. In one or more implementations, the selection manager 128 may include independent processing, memory, and/or logic components functioning as a computing and/or electronic device integrated with the mobile device 102. Although illustrated as a component or module of the configuration manager 118, the selection manager 128 may be implemented in or by the mobile device 102 as an independent and/or separate component or module of the device.

In this example system 100, the mobile device 102 can include a battery or any other type of similar power source, such as described with reference to the example device shown in FIG. 10, to power features of the mobile device, including the slidable display mount 116 that is the powered sliding or translation mechanism operable to transition the rollable display screen 104 around the surfaces of the device housing 114. In implementations, the rollable display screen 104 can be utilized to display any of various types of content on the mobile device 102. In one or more implementations, the mobile device 102 generates and/or outputs content from a device application 120 and/or operating system of the device, and the content is displayed on the rollable display screen 104. For example, a media application may receive streaming content from a remote server via a communication network for display on the rollable display screen.

Any of the devices, applications, modules, servers, and/or services described herein can communicate via a communication network, such as for data communication between the mobile device 102 and other communication and/or computing devices. The communication network can be implemented to include a wired and/or a wireless network, may be implemented using any type of network topology and/or communication protocol, and can be represented or otherwise implemented as a combination of two or more networks, to include IP-based networks and/or the Internet. The communication network may also include mobile operator networks that are managed by a mobile network operator and/or other network operators, such as a communication service provider, mobile phone provider, and/or Internet service provider.

In one or more implementations, the mobile device 102 may also be configured in other device form factors 108, such as a partial form factor, which is further shown and described with reference to FIG. 5, and other form factors as shown and described with reference to FIGS. 6 and 7. As noted above, the partial form factor may also be referred to as a "peek" form factor, and in this configuration, the rollable display screen 104 translates down (e.g., in an opposite direction of the extended display state). This display state provides for an unobstructed sensory view of various device sensors and/or components that are otherwise hidden behind the rollable display screen 104 in both the compact form factor (retracted display state) and expanded form factor (extended display state). For example, sensors such as a front-facing camera, environment sensors (e.g., for motion, sound, lighting, etc.), a proximity sensor, and/or a phone earpiece speaker can all be integrated in the mobile device 102 under the rollable display screen 104, and the slidable display mount 116 translates the display screen over or above the sensors. These under-the-display screen sensors are then exposed or visible for use in the sensor display state of the rollable display screen 104, which corresponds to the partial form factor of the mobile device 102.

In implementations, the configuration manager 118 initiates to configure the mobile device 102 in the partial form factor corresponding to the sensor display state of the rollable display screen 104 when an incoming voice call will require user access to the phone earpiece speaker, or when the front-facing camera is needed for image capture. Although generally described throughout this disclosure as the configuration manager 118 initiating and/or automatically controlling the configuration and/or reconfiguration of the mobile device form factors 108, a user of the device may initiate to configure the device in any form factor and/or display state of the rollable display screen, and override configuration settings of the configuration manager.

In one or more implementations, a portion of the rollable display screen 104 rotates around the housing 114 of the mobile device 102, such as in the compact form factor of the device, forming a rear-facing portion of the display screen (e.g., relative to the front-facing portion of the display screen shown in the compact form factor at 110 and in the expanded form factor at 112 in the example system 100). In implementations, both the front-facing portion and the rear-facing portion of the rollable display screen 104 can be used to display content, such as related content or content associated with two different applications. In the expanded form factor of the mobile device 102, the rear-facing portion of the rollable display screen 104 rotates around the device housing and becomes part of the front-facing portion of the display screen. Notably, the viewable display area of the rollable display screen 104 varies as the display screen is translated from the sensor display state to the retracted display state to the extended display state, and back.

In one or more implementations of the techniques described herein for a rollable screen device with piezoelectric sensing, the configuration manager 118 can initiate expanding the mobile device 102 from the compact form factor (shown at 110) to the expanded form factor (shown at 112) based on a variety of occurrences, such as user input to expand the device (e.g., a user pushes the screen in a particular way or at a particular location), initiation of an application on the device (e.g., a user opens an Internet browser or search engine), a call or text is received and so on. Notably the techniques described herein apply to any device that is configurable in at least two form factors, such as any type of extendable device or foldable device (e.g., a flip-phone), either of which can change form factors automatically, or manually by a user of the device. In this example system 100 of the mobile device 102, the device is expandable with the rollable display screen 104 configurable in one of multiple display states corresponding to respective device form factors.

In one or more implementations, the piezoelectric sensors 124 are configured to sense or detect one or more forces applied to the rollable display screen 104 of the mobile device 102. It is contemplated that the piezoelectric sensors 124 can be disposed at locations suitable to sense or detect forces applied to the front surface of the display screen, the back surface of the display screen, and/or to one or more edges of the rollable display screen of the mobile device. As used herein, sensing of forces can be sensing of the force itself (e.g., sensing of the magnitude of a force applied) or can be sensing of motion caused by a force (e.g., a force applied to the display screen moves the screen and/or other components and that movement is sensed). As described above, the slidable display mount 116 is operable to extend the rollable display screen 104 corresponding to the expanded form factor of the device or retract the rollable display screen corresponding to the compact form factor of the device. For a different type of mobile device, such as a flip-phone that is expanded manually (e.g., opened by a user of the device), the configuration manager 118 can initiate expanding the flip-phone device by displaying a user interface message to direct the manual expansion of the device, such as by instructing the user to open the flip-phone.

Figure 2:
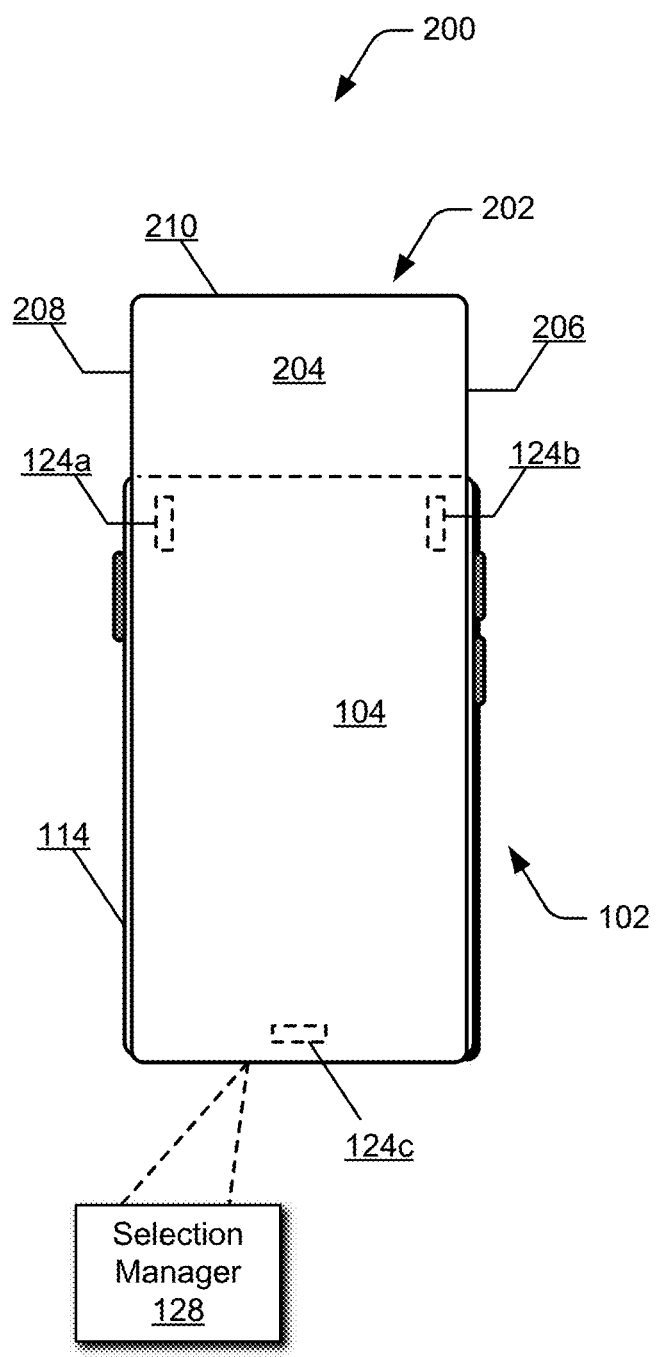
FIG. 2 further illustrates an example view of a mobile device with a rollable display screen and piezoelectric sensors in accordance with one or more implementations as described herein.

FIG. 2 further illustrates an example 200 of the mobile device 102 in aspects of a rollable screen device with piezoelectric sensing, as described herein. In this example, the configuration manager 118 has initiated operation of the slidable display mount 116 to expand the mobile device 102 from the compact form factor of the device to the expanded form factor of the device. As shown, an expansion of the device (e.g., from the compact form factor to the expanded form factor) can be utilized such that a distal portion 202 of the display screen 104 is extended outwardly, up, and/or away from the housing 114. As can be seen, relatively unobstructed access to the distal portion 202 of the display screen 104 is provided when the mobile device 102 is in its expanded form factor. In particular, relatively unobstructed access is provided to a front face portion 204 and a back face portion (shown at 708 in FIG. 7) of the distal portion of the display screen 104. With further reference to FIG. 2, relatively unobstructed access is provided to a first edge 206 (shown as a side edge), a second edge 208 (also shown as a side edge) and a third edge 210 (shown as a distal edge) of the distal portion 202 of the display screen 104.

Generally, each of the one or more piezoelectric sensors 124 are positioned on or about the mobile device 102 at locations suitable to sense one or more forces applied to the front, back, and/or side edges of the display screen 104. For example, a piezoelectric sensor 124 can be located on the housing 114 at a location where it can sense a force applied to an edge, the front face, the back face, or otherwise of the display screen. For the mobile device 102 shown in this example, a first piezoelectric sensor 124a is located to sense a force applied to the first edge 206 of the distal portion 202 of the display screen 104, a second piezoelectric sensor 124b is located to sense a force applied to the second edge 208 of the distal portion 202 of the display screen 104, and a third sensor 124c is located to sense a force applied to the third or distal edge 210 of the distal portion 202 of the display screen. Upon sensing of these forces, the piezoelectric sensors 124a, 124b, 124c can communicate, through electrical signals or otherwise, the detected forces to the selection manager 128 of the mobile device 102 to activate one or more of the device parameters 126 of the mobile device 102. In practice, the one or more forces can be applied to the display screen in a variety of ways. Commonly, a user of the device can apply the desired forces with a finger input. Alternatively, the forces can be applied with a stylus or any other suitable object.

Figure 3:
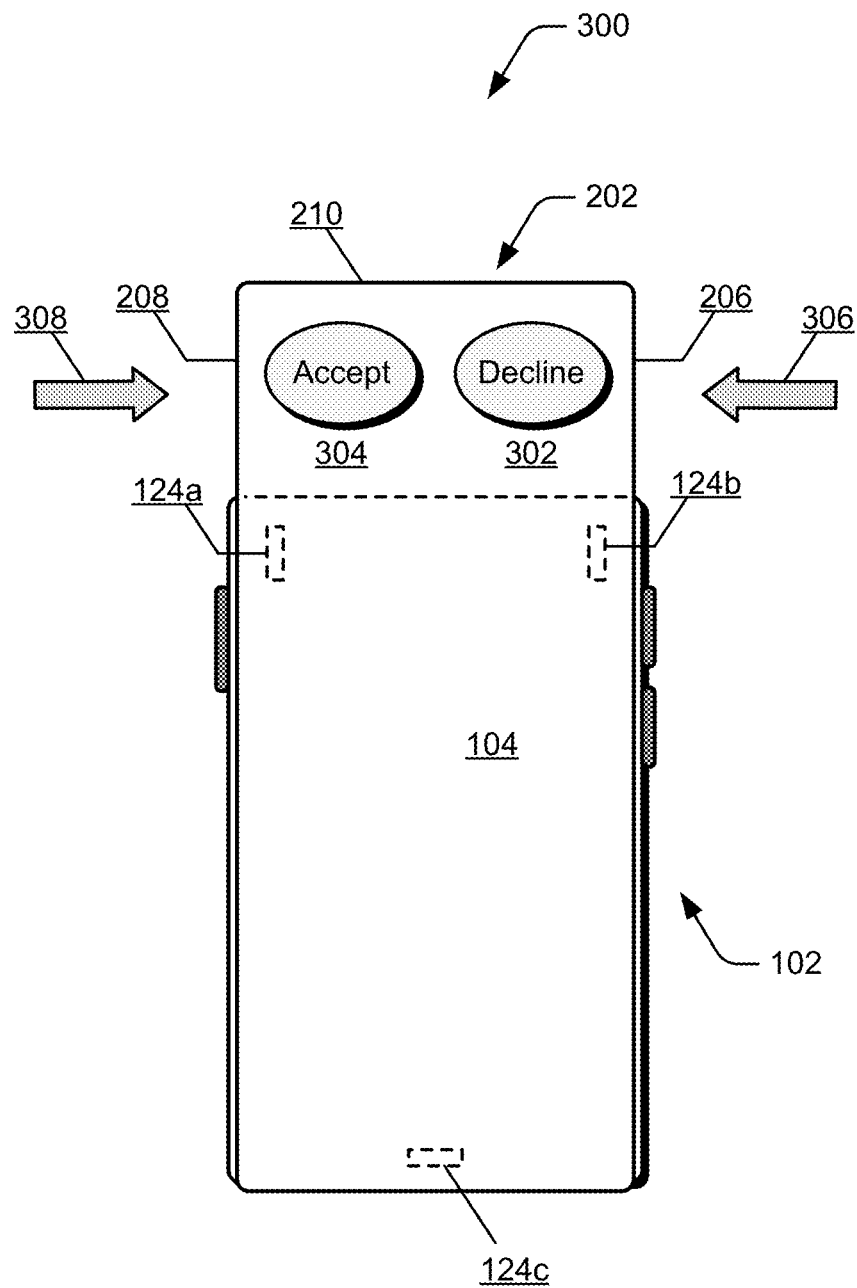
FIG. 3 further illustrates an example view of the mobile device with the rollable display screen and piezoelectric sensors in accordance with one or more implementations as described herein.

FIG. 3 illustrates an example 300 of an additional or alternative implementation of the mobile device for a rollable screen device with piezoelectric sensing, where one or more of the piezoelectric sensors 124 are used to sense one or more forces, which are then signaled, for example to the selection manager 128, to active call rejection or acceptance as parameters of the device. As shown in this example, an incoming call prompts a first visual icon 302 (e.g., indicated as "Decline") to display on the display screen 104 at a location adjacent the first edge 206 of the distal portion 202 of the display screen 104. Similarly, a second visual icon 304 (e.g., indicated as "Accept") to display on the display screen 104 at a location adjacent the second edge 208 of the distal portion 202 of the display screen 104. If the first piezoelectric sensor 124a senses a force 306 (generally shown as an arrow) applied to the first edge 206, then the first piezoelectric sensor signal sends a signal to the mobile device 102 (e.g., communicated to a cellular communication application on the device) to decline the incoming call. If the second piezoelectric sensor 124b senses a force 308 (generally shown as an arrow) applied to the second edge 208, the second piezoelectric sensor 124b sends a signal to the mobile device 102 to accept the call.

Advantageously, since piezoelectric sensors are quite sensitive to different amounts of force, the piezoelectric sensors of the mobile device 102 can be configured to sense different amounts of force to activate different parameters or activate a single parameter differently. Thus, for any of the applications or techniques described herein, it is contemplated that a first force (e.g., a finger tap) applied to a location of the display screen 104 causes a piezoelectric sensor 124 to send a first signal to the mobile device (e.g., the selection manager of the mobile device) to activate a first parameter, while a second force (e.g., a finger press) of greater magnitude than the first force applied to the same location of the display screen 104 causes the piezoelectric sensor to activate a second parameter or activate the first parameter differently. For example, and without limitation, a first force applied to a location of the display screen 104 might be initiated to accept an incoming call to the mobile device 102, while the second force applied to the same location of the display screen might be initiated to both accept the incoming call and place the call in speaker mode. As an alternative example, a first force might make a first stepwise change in the volume of a speaker of the mobile device 102, while a second force of greater magnitude might make a second and larger change in the volume of the speaker.

With further reference to FIG. 3, the operation of accepting or declining an incoming call can be more refined by the use of different forces. For example, if the force 308 applied to the second edge 208 of the display screen 104 is relatively weak (e.g., a tap), then the piezoelectric sensor 124b can detect and send a signal to accept and answer an incoming call. However, if the force 308 is relatively strong (e.g., a press), then the piezoelectric sensor 124b can detect and send a signal to accept and answer the incoming call in speaker mode. As another example, if the force 306 applied to the first edge 206 of the display screen 104 is relatively weak (e.g., a tap), then the piezoelectric sensor 124a can detect and send a signal to decline and silence an incoming call. However, if the force 306 is relatively strong (e.g., a press), then the piezoelectric sensor 124a can detect and send a signal to decline and silence an incoming call, as well as initiate sending a text to the caller indicating, for example, "I am unavailable, but will call you back soon".

In an additional or alternative implementation of the rollable screen device with piezoelectric sensing, the one or more piezoelectric sensors 124 are used to forward or reverse media applications being played on the mobile device. For example, and with reference to FIG. 2, a relatively lighter force (e.g., a tap) on one of the edges 206, 208 of the distal portion 202 of the display screen 104 could be used to initiate fast-forwarding through content (e.g., audio and/or visual content) of an application a predetermined amount of time (e.g., 5 seconds of content). Similarly, such a force on the other of the edges 206, 208 of the distal portion 202 of the display screen 104 could be used to initiate reversing through the content (e.g., the audio and/or visual content) of an application a predetermined amount of time (e.g., 5 seconds of content). Additionally or alternatively, a relatively stronger force (e.g., a press) on one of the edges 206, 208 of the distal portion 202 of the display screen 104 could be used to fast-forward through the content (e.g., the audio and/or visual content) continuously until such force is released, while such a force on the other of the edges 206, 208 of the distal portion 202 of the display screen 104 could be used to initiate reversing through the content (e.g., the audio and/or visual content) continuously until such force is released.

In an additional or alternative implementations of the rollable screen device with piezoelectric sensing, the one or more piezoelectric sensors 124 can be used to sense translating forces to activate (e.g., adjust) device parameters 126 of the mobile device 102. As used herein, a translating force is a force that is initially applied at one location of the display screen 104, particularly on or at the distal portion 202 of the display screen, and then moved along the screen, particularly along the distal portion of the screen, to a second location. For example, an applied force (e.g., a finger press) may be detected at an edge of the display screen 104 and as the force is moved along the edge of the screen to activate (e.g., adjust) a device parameter (e.g., volume of a speaker) of the mobile device.

Figure 4:
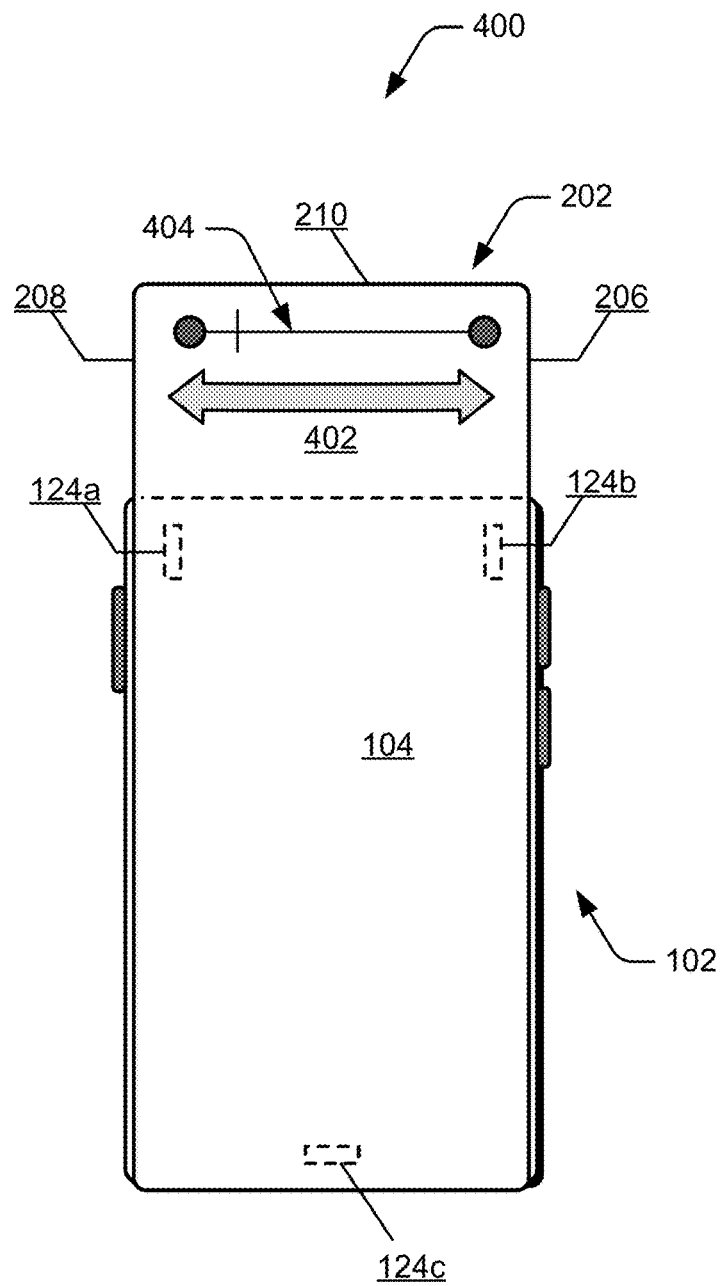
FIG. 4 further illustrates an example view of the mobile device with the rollable display screen and piezoelectric sensors in accordance with one or more implementations as described herein.

FIG. 4 illustrates an example 400 of an additional implementation of the mobile device for a rollable screen device with piezoelectric sensing. In this example configuration, a translating force (e.g., a finger touch or press) is applied to the distal edge 210 of the distal portion 202 of the display screen 104 and moved along the edge 210 in one of the directions indicated by the arrow 402 by an object (e.g., a finger) for signaling the piezoelectric sensor 124c to signal the mobile device 102 to adjust a parameter. As shown, an indicator 404 is displayed on the distal portion 202 of the display screen 104 to indicate a change of dimension (e.g., magnitude) of the parameter as the force is moved along the distal edge 210. As one example, the volume (e.g., a volume of a speaker of the device, or a speaker of headphones, or the like) can be adjusted this way with the displayed indicator 404 providing an indication of how loud or quiet the volume is.

As another example, a duration time within content (e.g., audio or visual content) that is being played back by an application on the mobile device 102 can be adjusted as a mechanism for fast-forwarding or reversing through the content, and the indicator 404 provides an indication of how far into the content the playback has progressed. In yet another implementation of the rollable screen device with piezoelectric sensing, the one or more piezoelectric sensors 124 can be used to sense game triggers. For example, the piezoelectric sensors 124 may sense forces (e.g., tapping or pressing) as applied on different edges of the display screen 104, and transmit those forces as different commands for a game being played on the device.

In an implementation of the rollable screen device with piezoelectric sensing, the device provides feedback when the one or more piezoelectric sensors 124 detects or senses one or more forces applied to the display screen 104. The feedback can be designed to inform a user that either a force was sensed by a piezoelectric sensor 124, which initiates activation of a device parameter 126 of the device, or to indicate that a force was detected or sensed by a piezoelectric sensor 124, but the device parameter is not activating. In implementations, the feedback can be audible, tactile, and/or visible and can be initiated by the selection manager 128 in the mobile device 102. As one example, an audible sound (e.g., a beep) may be emitted from a speaker of the device based on the sensing of a force by a piezoelectric sensor 124. As an additional or alternative example, a signal, vibration, or motion (e.g., a wiggle) may be emitted from the display screen 104 or from another portion of the mobile device 102 based on the sensing of a force by a piezoelectric sensor.

In an implementation of the rollable screen device with piezoelectric sensing, the natural response of the one or more piezoelectric sensors 124 is used to provide feedback. Many piezoelectric sensors provide a natural reflex voltage when an object applies a force to the piezoelectric sensor. Thus, in such an implementation, if a force (e.g., a force provided by a user of the device) is applied to the display screen 104 of the mobile device 102 causing the screen to contact a piezoelectric sensor 124 with an applied force, the reflex voltage of the piezoelectric sensor will apply a reflex force to the screen, which, in turn, provides a feedback force against the force being applied to the screen. In this example, a user can apply a force to the display screen 104 to activate a device parameter 126 of the mobile device 102 via the piezoelectric sensor 124 and the piezoelectric sensor will apply a reflex force back to the display screen and the user, thereby informing the user that the force was sensed. In alternative implementations, the reflex voltage of the one or more piezoelectric sensors 124 can be employed to generate and provide audible feedback and/or visible feedback.

The reflex or feedback voltage of a piezoelectric sensor 124 will indicate to a user that the force was sensed by the piezoelectric sensor. Typically, the feedback or reflex voltage also informs a user that the force applied to the display screen 104 has successfully activated a device parameter 126 of the mobile device 102. However, it is also contemplated that, for various reasons, the force applied to one or more of the piezoelectric sensors 124 might not activate a parameter of the device. For example, and without limitation, a user might apply a force to the display screen 104 with the intent of raising the volume of a speaker to which the device is providing sound but the device, the speaker, or both may already be outputting a maximum volume. While the force applied to the display screen 104 may result in a reflex voltage providing feedback, no volume change will occur. In such situations, it may be desirable to provide a secondary feedback to indicate that a device parameter (e.g., the volume) was not activated (e.g., changed). Such feedback may be in nearly any form, such as audible feedback (e.g., a beep), visible feedback, tactile feedback, or the like.

Advantageously, the piezoelectric sensors 124 can be actuated at the same time that they are sensing forces (e.g., are being deflected) such that the natural reflex voltage of the piezoelectric sensors can be caused to provide predetermined types of feedback. As used herein, the term "actuating" and its conjugations of the term is used to refer to actuating a piezoelectric sensor 124, and means to exercise a level of control over the natural reflex voltage of the piezoelectric sensor after a force is applied to the sensor. In addition to the natural reflex voltage providing a physical force feedback, the natural reflex voltage can provide an audible feedback and/or a visible feedback. As one example, the reflex voltage of a piezoelectric sensor 124 can be actuated such that it produces two or more pulses of reflex force and/or sound creating a "popple" effect. As another example, the magnitude of a reflex voltage of a piezoelectric sensor 124 can be actuated by gradually lessening or increasing the reflex voltage as a device parameter (e.g., volume) of the device is lessening or increasing, thereby producing physical, audible, or visible feedback that is also lessening or increasing. This latter example can be employed in conjunction with the translating force discussed in conjunction with FIG. 4. In this example configuration in which a force (e.g., a finger touch or press) is moved along the edge 210 of the display screen 104 in a direction indicated by the arrow 402, the feedback from a piezoelectric sensor 124 can be lessening or increasing in coordination with the change of dimension (e.g., magnitude) of the parameter as the force is moved along the distal edge 210.

The degree to which a force applied to the display screen 104 deflects a piezoelectric sensor 124 or provides a motion detectable by the piezoelectric sensor is typically a function of one or more of the position of the display screen relative to the piezoelectric sensor; the location and direction of the force being applied to the display screen; and/or the location and orientation of the piezoelectric sensor relative to the display screen. As such, the use of such piezoelectric sensors 124 can offer a wide variety of options for sensing forces to accommodate a wide variety of input forces to initiate activation of the device parameters 126 of the mobile device.

Figure 5:
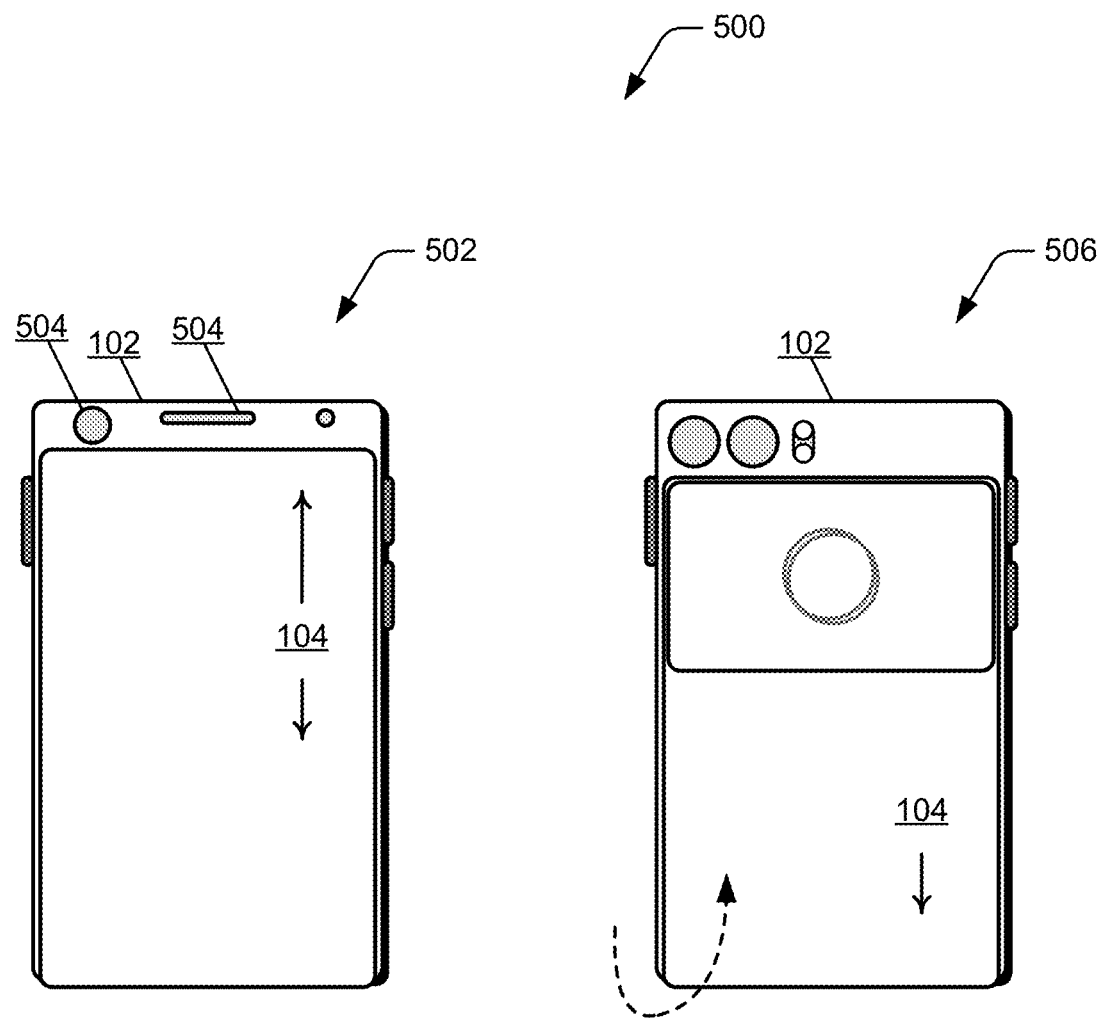
FIG. 5 illustrates example views of a mobile device for implementations of the rollable display screen with piezoelectric sensors, in accordance with one or more implementations as described herein.

FIG. 5 further illustrates example views 500 of the mobile device in aspects of rollable screen device with piezoelectric sensing, as described herein. In these example views 500, the mobile device 102 is shown in a front view 502 in the partial form factor (e.g., also referred to as the "peek" form factor), with the rollable display screen 104 configured in the sensor display state. In this configuration, the rollable display screen 104 translates down (e.g., in an opposite direction of the extended display state). This sensor display state provides for an unobstructed sensory view of various device sensors 504 and/or components that are otherwise hidden behind the rollable display screen 104 in both the compact form factor (retracted display state) and expanded form factor (extended display state). For example, the device sensors 504, such as a front-facing camera, environment sensors (e.g., for motion, sound, lighting, etc.), a proximity sensor, and/or phone earpiece speaker can all be integrated in the mobile device 102 under the rollable display screen 104, and the slidable display mount 116 translates the display screen over or above the sensors. These under-the-display screen sensors are then exposed or visible for use in the sensor display state of the rollable display screen 104 that corresponds to the partial form factor of the mobile device 102. In these example views 500, the mobile device 102 is also shown in a back view 506 in the partial form factor of the device, with the rollable display screen 104 configured in the sensor display state. The rollable display screen 104 is translated by the slidable display mount 116 around the device housing and forms the rear-facing portion of the display screen.

Figure 6:
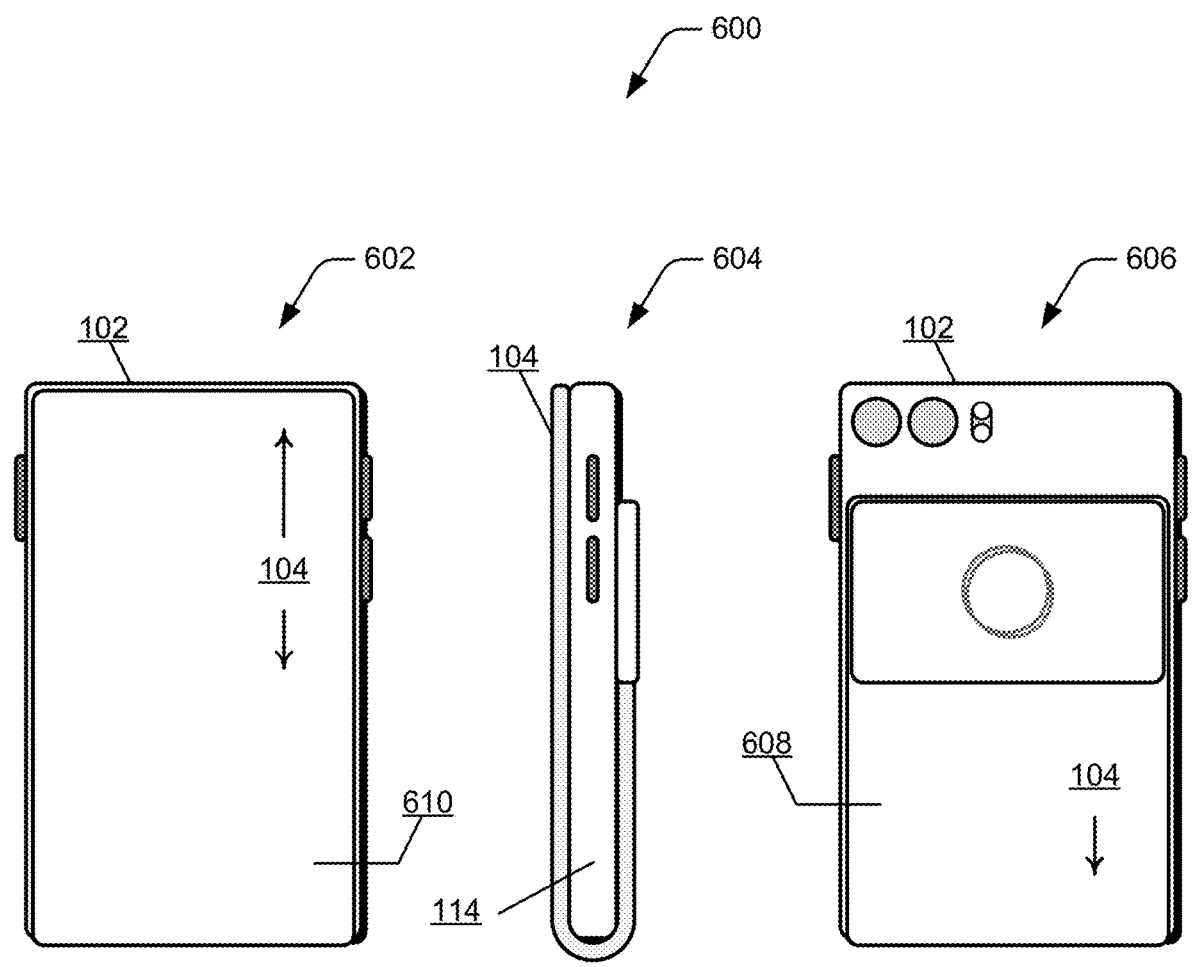
FIG. 6 illustrates example views of a mobile device in a compact form in implementations of the rollable display screen with the piezoelectric sensors, in accordance with one or more implementations as described herein.

FIG. 6 further illustrates example views 600 of the mobile device in aspects of rollable screen device with piezoelectric sensing, as described herein. In these example views 600, the mobile device 102 is shown in a front view 602, a side view 604, and a back view 606 in the compact form factor, with the rollable display screen 104 configured in the retracted display state. In this configuration, a portion of the rollable display screen 104 rotates around the housing of the mobile device 102, forming a rear-facing portion 608 of the display screen (e.g., relative to the front-facing portion 610 of the display screen). In implementations, both the front-facing portion 610 and the rear-facing portion 608 of the rollable display screen 104 can be used to display content, such as related content or content associated with different applications.

Figure 7:
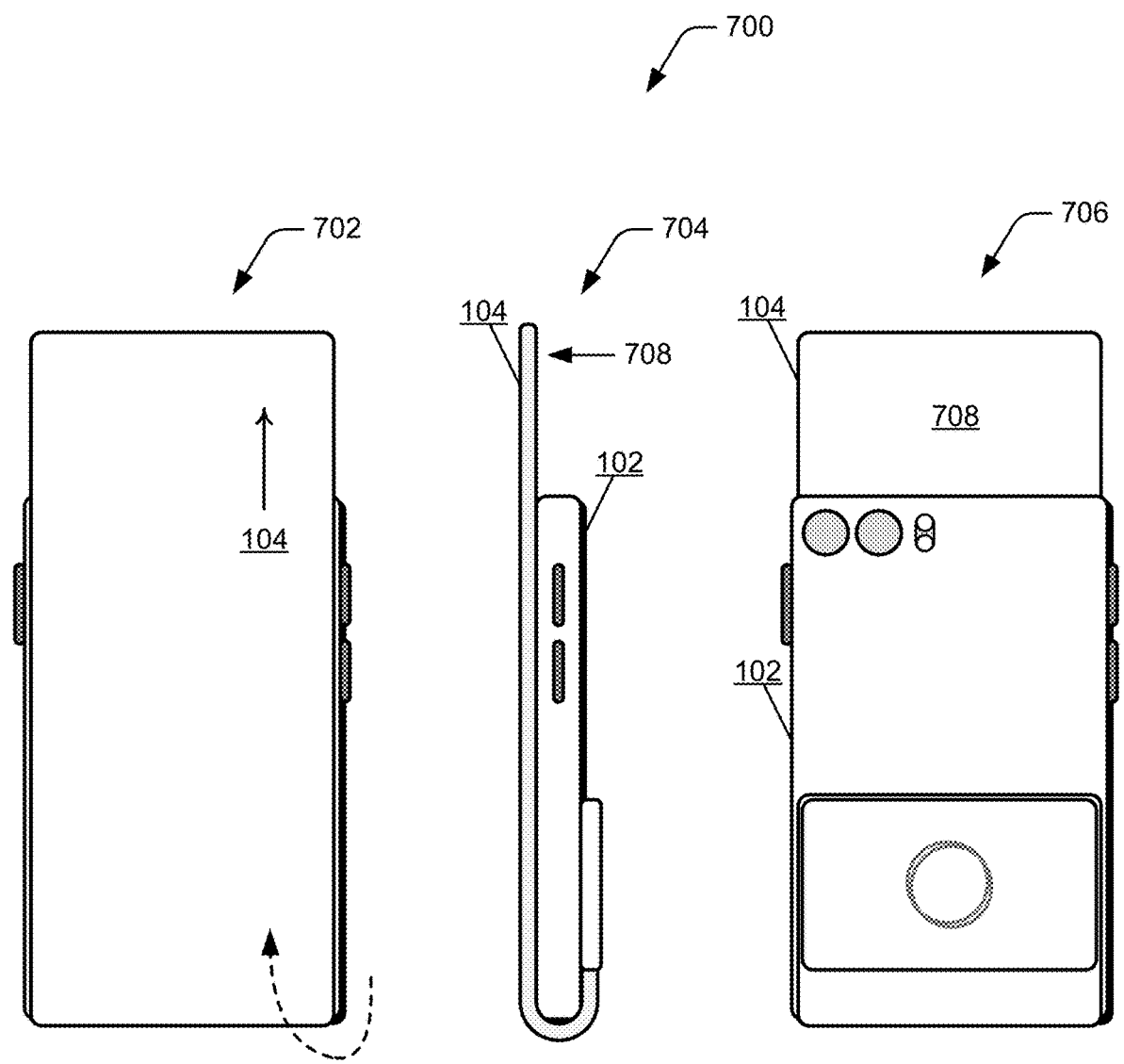
FIG. 7 illustrates example views of the mobile device in an expanded form in implementations of the rollable display screen with the piezoelectric sensors, in accordance with one or more implementations as described herein.

FIG. 7 further illustrates example views 700 of the mobile device in aspects of rollable screen device with piezoelectric sensing, as described herein. In these example views 700, the mobile device 102 is shown in a front view 702, a side view 704, and a back view 706 in the expanded form factor, with the rollable display screen 104 configured in the extended display state. In this configuration, the rear-facing portion of the rollable display screen 104 rotates around the device housing and becomes part of the front-facing portion of the display screen. Notably, the viewable display area of the rollable display screen 104 varies as the display screen is translated from the sensor display state to the retracted display state to the extended display state, and back. In this configuration of the mobile device 102 in the expanded form factor, a back face portion 708 of the display screen 104 is exposed above the device housing when the rollable display screen 104 is configured in the extended display state.

As illustrated in the figures, the slidable display mount 116 translates the rollable display screen 104 around the device housing to change the overall length of the flexible display as viewed from the front of the mobile device 102 (e.g., as shown in the front view 702). The slidable display mount 116 also translates the rollable display screen 104 in an opposite direction around the device housing to the retracted display state in the compact form factor of the device, and more of the rollable display screen 104 is viewable as the rear-facing portion of the display. Content, such as any type of graphics and images, can be displayed on any section of the rollable display screen 104, including on the front-facing portion, on the rear-facing portion, and/or on the curved end portion of the display screen.

Figure 8:
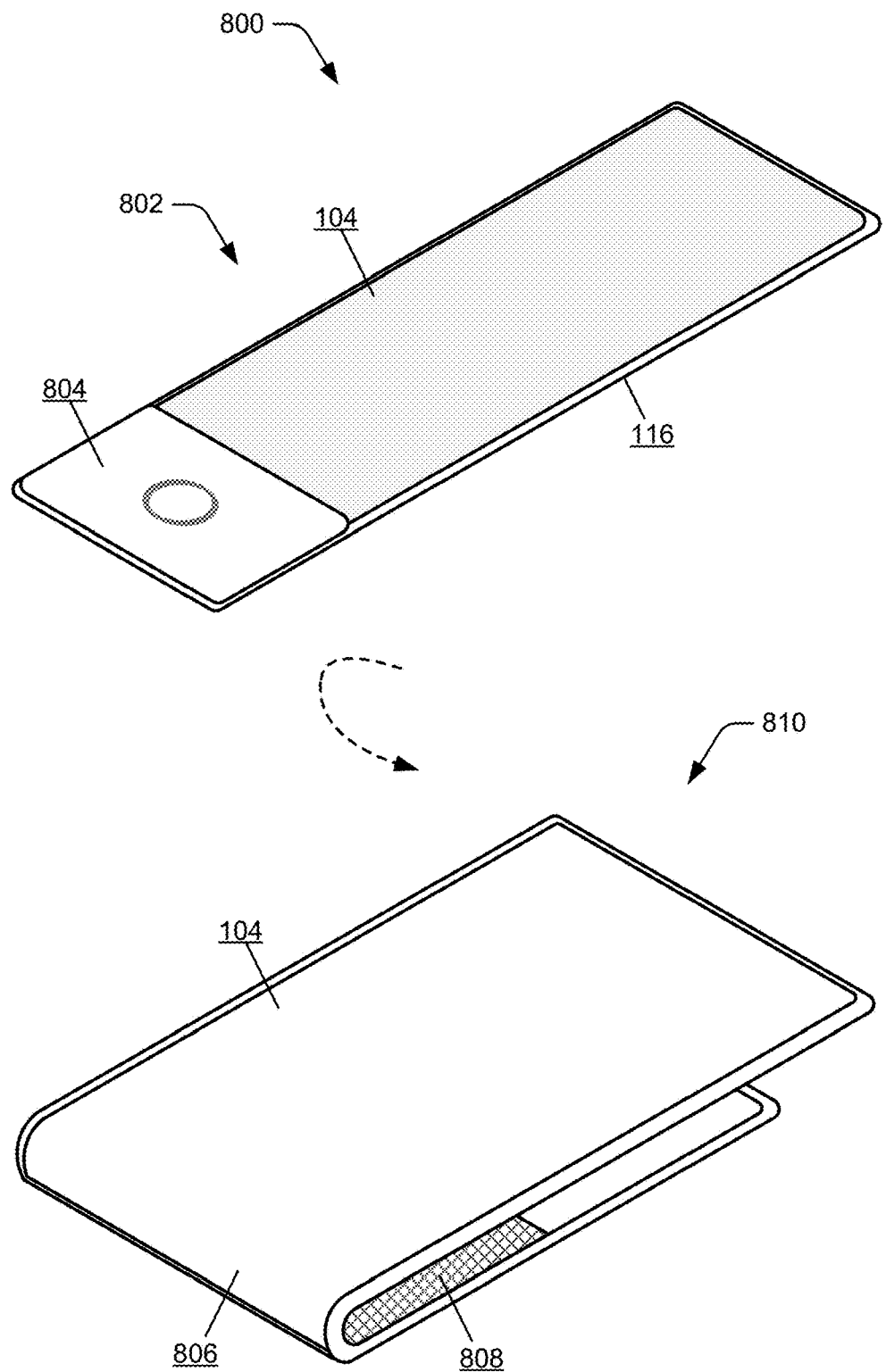
FIG. 8 illustrates example views of a rollable display screen and mounting assembly for implementations of the rollable screen device with piezoelectric sensing, in accordance with one or more implementations of the techniques described herein.

FIG. 8 illustrates example views 800 of the rollable display screen and the slidable display mount of the mobile device in aspects of a rollable screen device with piezoelectric sensing, as described herein. In these example views 800, the rollable display screen 104 integrated with the slidable display mount 116 is shown configured at 802, along with a backplate 804. A display roller mechanism can be implemented to facilitate the flexible display and mounting assembly (e.g., the rollable display screen 104 and the slidable display mount 116) wrapping around the device housing. The display roller mechanism includes a rotor positioned within the curvilinear section 806 of the flexible display and mounting assembly to facilitate translation of the rollable display screen 104 in the various display states. In one or more implementations, the slidable display mount 116 includes a substrate that includes a flexible portion 808, which allows the flexible display and mounting assembly to wrap and deform around the device housing. As shown at 810, the rollable display screen 104 and the slidable display mount 116 are wrapped around to form the curvilinear section 806 of the flexible display, along with two linear sections of the display as the front-facing portion and the rear-facing portion of the rollable display screen. As shown in the example views 800, a cross section of the rollable display screen 104 and the slidable display mount 116 forms a J-shape or U-shape with the curvilinear section 806 of the display.

Example method 900 is described with reference to FIG. 9 in accordance with one or more implementations of a rollable screen device with piezoelectric sensing, as described herein. Generally, any services, components, modules, managers, controllers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 9:
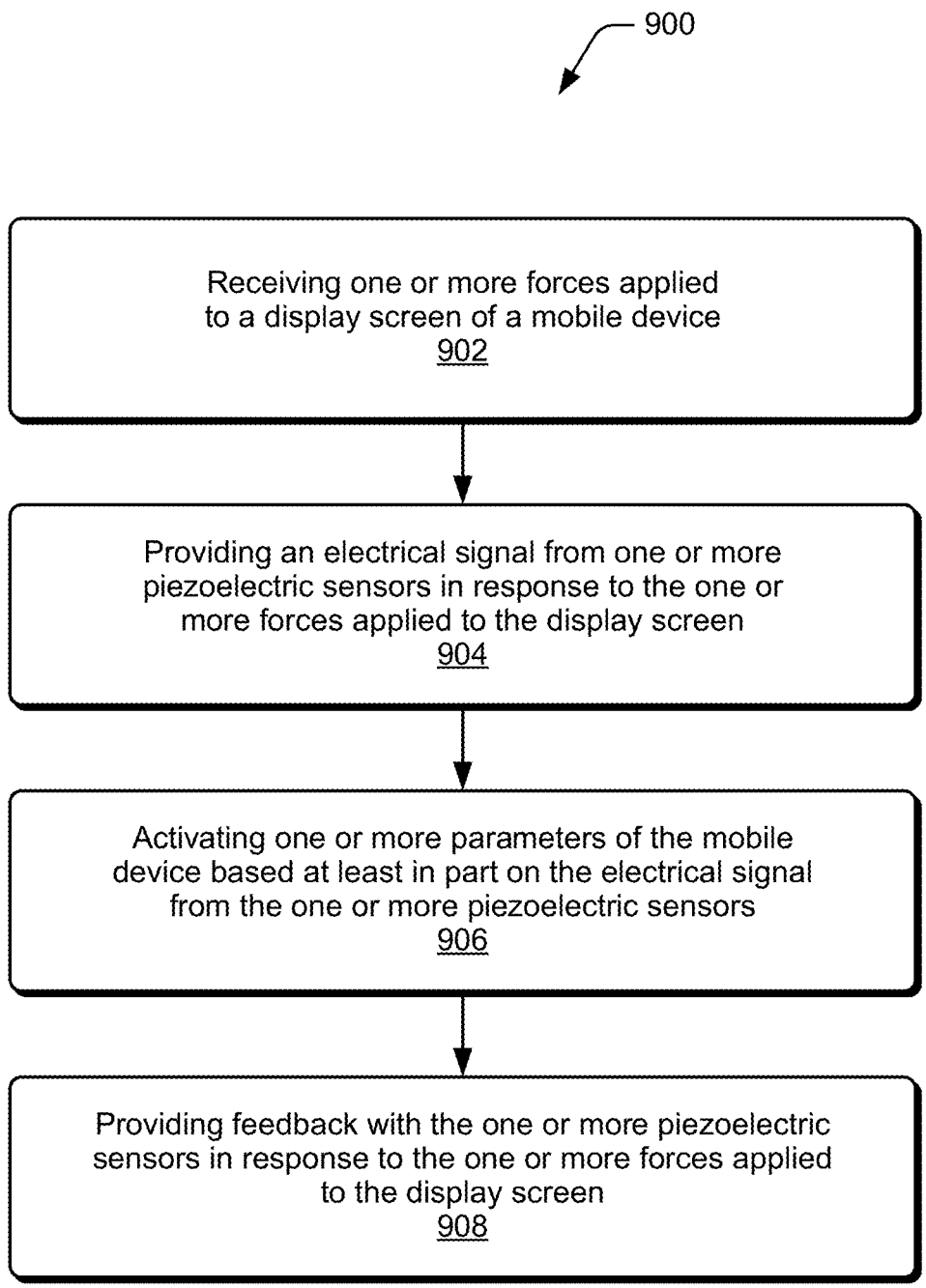
FIG. 9 illustrates an example method for a rollable screen device with piezoelectric sensing in accordance with one or more implementations of the techniques described herein.

FIG. 9 illustrates one or more example methods 900 implementing one or more aspects of a rollable screen device with piezoelectric sensing, as described herein. The order in which the method is described is not intended to be construed as a limitation, and any number or combination of the described method operations may be performed in any order to perform a method, or an alternate method.

At 902, one or more forces applied to a display screen of a mobile device are received. For example, a user of the mobile device 102 can apply one or more forces to the display screen 104 of the device, such as to activate a user-selectable control and/or to initiate a device or application parameter.

At 904, one or more piezoelectric sensors provide an electrical signal in response to the one or more forces applied to the display screen. For example, the selection manager 128 implemented in the mobile device 102 receives electrical signals from the one or more piezoelectric sensors 124 in response to the one or more forces applied to the display screen 104 of the device. In implementations, the piezoelectric sensors 124 can be disposed at locations on or about the mobile device 102 suitable to sense or detect the one or more forces applied to the front surface of the display screen, the back surface of the display screen, and/or to one or more edges of the rollable display screen 104 of the mobile device.

At 906, one or more parameters or the mobile device are activated based on the electrical signal from the one or more piezoelectric sensors. For example, the selection manager 128 activates one or more of the device parameters 126 based on receiving the one or more electrical signals from the respective one or more piezoelectric sensors 124. The device parameters 126 can be selected from at least one of volume, call acceptance, call decline, messaging, a speaker mode, and/or any other type of device or application parameter.

At 908, the one or more piezoelectric sensors provide feedback in response to the one or more forces applied to the display screen. For example, a user may apply one or more forces to one or more edges and/or surfaces of the display screen 104, and the forces can then be sensed by the one or more piezoelectric sensors for 124 controlling one or more of the device parameters 126 of the device and/or for providing feedback to the user that the one or more applied forces were successfully sensed. In implementations, the feedback can be selected and provided as at least one of audible, tactile, or visible feedback.

Figure 10:
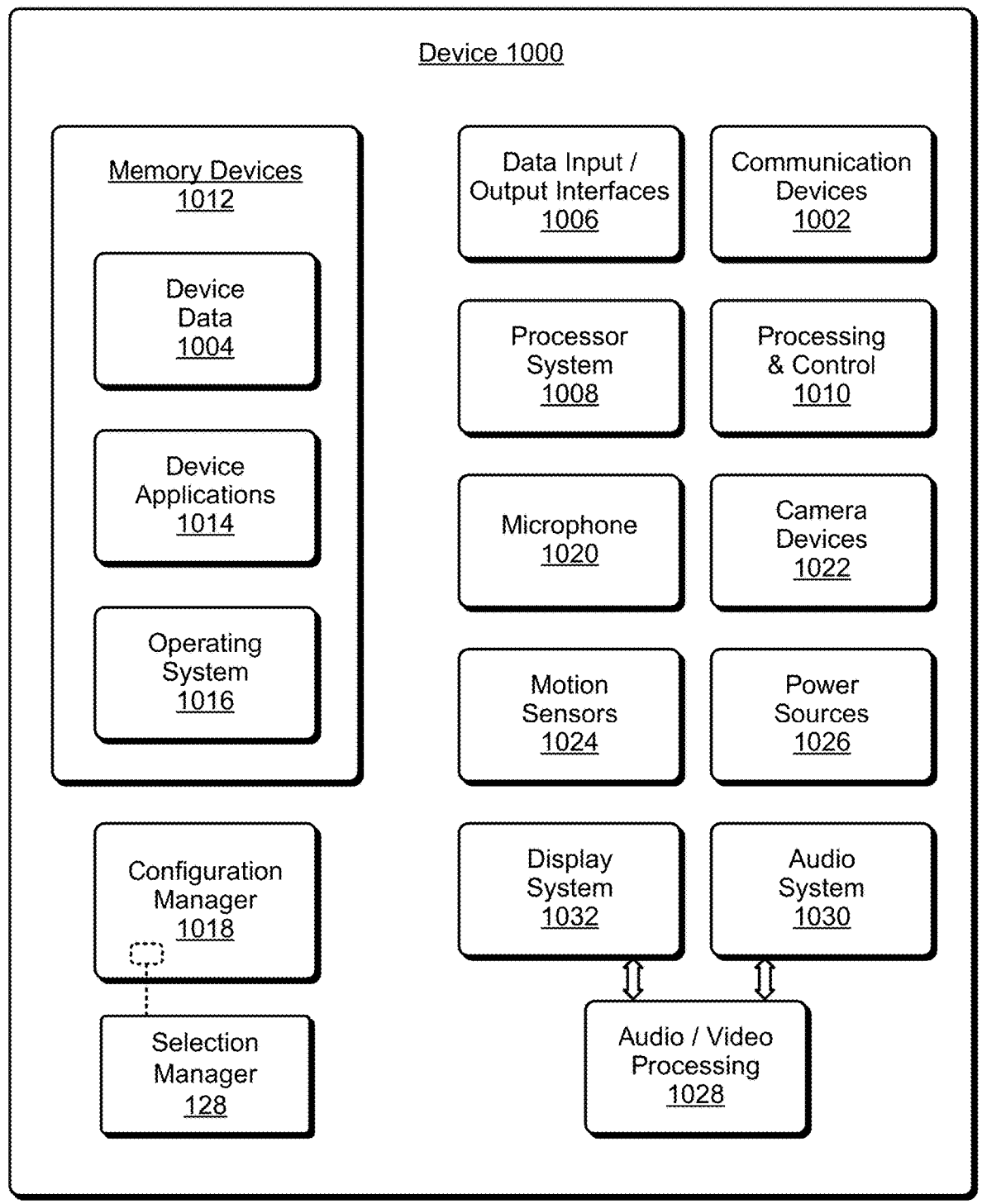
FIG. 10 illustrates various components of an example device that can be used to implement the techniques for a rollable screen device with piezoelectric sensing as described herein.

FIG. 10 illustrates various components of an example device 1000, which can implement aspects of the techniques and features for a rollable screen device with piezoelectric sensing, as described herein. The example device 1000 can be implemented as any of the devices described with reference to the previous FIGS. 1-9, such as any type of a wireless device, mobile device, mobile phone, flip phone, client device, companion device, paired device, display device, tablet, computing, communication, entertainment, gaming, media playback, and/or any other type of computing and/or electronic device. For example, the mobile device 102 described with reference to FIGS. 1-9 may be implemented as the example device 1000.

The example device 1000 can include various, different communication devices 1002 that enable wired and/or wireless communication of device data 1004 with other devices. The device data 1004 can include any of the various device data and content that is generated, processed, determined, received, stored, and/or communicated from one computing device to another. Generally, the device data 1004 can include any form of audio, video, image, graphics, and/or electronic data that is generated by applications executing on a device. The communication devices 1002 can also include transceivers for cellular phone communication and/or for any type of network data communication.

The example device 1000 can also include various, different types of data input/output (I/O) interfaces 1006, such as data network interfaces that provide connection and/or communication links between the devices, data networks, and other devices. The I/O interfaces 1006 can be used to couple the device to any type of components, peripherals, and/or accessory devices, such as a computer input device that may be integrated with the example device 1000. The I/O interfaces 1006 may also include data input ports via which any type of data, information, media content, communications, messages, and/or inputs can be received, such as user inputs to the device, as well as any type of audio, video, image, graphics, and/or electronic data received from any content and/or data source.

The example device 1000 includes a processor system 1008 of one or more processors (e.g., any of microprocessors, controllers, and the like) and/or a processor and memory system implemented as a system-on-chip (SoC) that processes computer-executable instructions. The processor system 1008 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 1010. The example device 1000 may also include any type of a system bus or other data and command transfer system that couples the various components within the device. A system bus can include any one or combination of different bus structures and architectures, as well as control and data lines.

The example device 1000 also includes memory and/or memory devices 1012 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 1012 include volatile memory and non-volatile memory, fixed and removable media devices, and any suitable memory device or electronic data storage that maintains data for computing device access. The memory devices 1012 can include various implementations of random-access memory (RAM), read-only memory (ROM), flash memory, and other types of storage media in various memory device configurations. The example device 1000 may also include a mass storage media device.

The memory devices 1012 (e.g., as computer-readable storage memory) provide data storage mechanisms, such as to store the device data 1004, other types of information and/or electronic data, and various device applications 1014 (e.g., software applications and/or modules). For example, an operating system 1016 can be maintained as software instructions with a memory device 1012 and executed by the processor system 1008 as a software application. The device applications 1014 may also include a device manager, such as any form of a control application, software application, signal-processing and control module, code that is specific to a particular device, a hardware abstraction layer for a particular device, and so on.

In this example, the device 1000 includes a configuration manager 1018 that implements various aspects of the described features and techniques described herein, to include the selection manager 128. The configuration manager 1018 and/or the selection manager 128 can be implemented with hardware components and/or in software as one of the device applications 1014, such as when the example device 1000 is implemented as the mobile device 102 described with reference to FIGS. 1-9. An example of the configuration manager 1018 is the configuration manager 118 implemented in the mobile device 102, such as a software application and/or as hardware components in the wireless device. In implementations, the configuration manager 1018 and/or the selection manager 128 may include independent processing, memory, and logic components as a computing and/or electronic device integrated with the example device 1000.

The example device 1000 can also include a microphone 1020 and/or camera devices 1022, as well as proximity and/or motion sensors 1024, such as may be implemented as components of an inertial measurement unit (IMU). The proximity and/or motion sensors 1024 can be implemented with various sensors, such as a gyroscope, an accelerometer, and/or other types of motion sensors to sense motion of the device. The motion sensors 1024 can generate sensor data vectors having three-dimensional parameters (e.g., rotational vectors in x, y, and z-axis coordinates) indicating location, position, acceleration, rotational speed, and/or orientation of the device. The example device 1000 can also include one or more power sources 1026, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 1000 can also include an audio and/or video processing system 1028 that generates audio data for an audio system 1030 and/or generates display data for a display system 1032. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 1000. Alternatively, the audio system and/or the display system are external, peripheral components to the example device.

Although implementations of a rollable screen device with piezoelectric sensing have been described in language specific to features and/or methods, the appended claims are not necessarily limited to the specific features or methods described. Rather, the specific features and methods are disclosed as example implementations of a rollable screen device with piezoelectric sensing, and other equivalent features and methods are intended to be within the scope of the appended claims. Further, various different examples are described, and it is to be appreciated that each described example can be implemented independently or in connection with one or more other described examples. Additional aspects of the techniques, features, and/or methods discussed herein relate to one or more of the following:

A mobile device, comprising: a housing; a display screen moveable relative to the housing such that the mobile device has a compact form factor and an expanded form factor; one or more piezoelectric sensors positioned relative to the display screen and configured to detect one or more forces applied to the display screen; and a selection manager configured to activate one or more parameters of the mobile device based at least in part on detecting the one or more forces applied to the display screen.

Alternatively, or in addition to the above described mobile device, any one or combination of: the one or more parameters include at least one of volume, call acceptance, call decline, messaging, or a speaker mode. The one or more piezoelectric sensors provide feedback responsive to the one or more forces, the feedback indicating that the one or more forces were received as input to activate the one or more parameters. The feedback is at least one of audible, tactile, or visible. The display screen includes one or more edges that move away from the housing when the display screen is moved from the compact form factor to the expanded form factor of the mobile device, and wherein contact with the one or more edges is detected as the one or more forces. The one or more piezoelectric sensors include a first piezoelectric sensor disposed to detect a first force applied to a first edge of the display screen and a second piezoelectric sensor disposed to detect a second force applied to a second edge of the display screen. The selection manager is configured to activate a first parameter of the one or more parameters based on the first force detected by the first piezoelectric sensor, and the selection manager is configured to activate a second parameter of the one or more parameters based on the second force detected by the at least second piezoelectric sensor. The display screen is configured to display a notice of an incoming call on a portion of the display screen; and the one or more parameters include declining the incoming call if a force is detected as applied to an edge of the display screen adjacent the notice.

A method, comprising: providing an electrical signal from one or more piezoelectric sensors in response to one or more forces applied to a display screen of a mobile device, the mobile device having a housing with the display screen being moveable relative to the housing; and activating one or more parameters of the mobile device based at least in part on the electrical signal from the one or more piezoelectric sensors.

Alternatively, or in addition to the above described method, any one or combination of: the one or more parameters include at least one of volume, call acceptance, call decline, messaging or a speaker mode. The method further comprising providing feedback with the one or more piezoelectric sensors, the feedback being responsive to the one or more forces and indicating that the one or more forces were received as input to activate the one or more parameters. The feedback is at least one of audible, tactile, or visible. The display screen includes one or more edges that move away from the housing when the display screen is moved from a compact form factor to an expanded form factor of the mobile device, and wherein contact with the one or more edges is detected as the one or more forces. The one or more piezoelectric sensors includes a first piezoelectric sensor disposed to detect a first force applied to a first edge of the display screen and at least a second piezoelectric sensor disposed to detect a second force applied to a second edge of the display screen. The method further comprising activating a first parameter of the one or more parameters based on the first force detected by the first piezoelectric sensor, and activating a second parameter of the one or more parameters based on the second force detected by the at least second piezoelectric sensor. The method further comprising displaying a notice of an incoming call on a portion of the display screen, and declining the incoming call if a force is detected as applied to an edge of the display screen adjacent the notice.

A system, comprising: a display screen moveable between one or more screen positions, at least one screen position of the display screen exposing one or more edges of the display screen; one or more piezoelectric sensors positioned to positioned relative to the display screen and configured to detect one or more forces applied to the one or more edges of the display screen; and a selection manager configured to activate one or more device parameters based at least in part on detecting the one or more forces applied to the display screen.

Alternatively, or in addition to the above described system, any one or a combination of: the one or more piezoelectric sensors provide feedback responsive to the one or more forces, the feedback indicating that the one or more forces were received as input to activate the one or more device parameters. The feedback is at least one of audible, tactile, or visible. The one or more piezoelectric sensors include a first piezoelectric sensor disposed to detect a first force applied to a first edge of the display screen and at least a second piezoelectric sensor disposed to detect a second force applied to a second edge of the display screen; and the selection manager is configured to activate a first parameter of the one or more device parameters based on the first force detected by the first piezoelectric sensor, and activate a second parameter of the one or more device parameters based on the second force detected by the at least second piezoelectric sensor.

The invention claimed is:

1. A mobile device, comprising:
   a housing;
   a display screen moveable relative to the housing such that the mobile device has a compact form factor and an expanded form factor, the display screen having a first edge and a second edge that extend from the housing when the display screen is moved from the compact form factor to the expanded form factor;
   one or more piezoelectric sensors positioned relative to the display screen and configured to detect one or more forces applied to the display screen, the one or more piezoelectric sensors including a first piezoelectric sensor disposed to detect a first force applied to the first edge of the display screen and a second piezoelectric sensor disposed to detect a second force applied to the second edge of the display screen; and
   a selection manager configured to activate one or more parameters of the mobile device based at least in part on detecting the one or more forces applied to the display screen, a first parameter of the one or more parameters configured to activate based on the first force detected by the first piezoelectric sensor, and a second parameter of the one or more parameters configured to activate based on the second force detected by the second piezoelectric sensor.

2. The mobile device of claim 1, wherein the one or more parameters include at least one of volume, call acceptance, call decline, messaging, or a speaker mode.

3. The mobile device of claim 1, wherein the one or more piezoelectric sensors provide feedback responsive to the one or more forces, the feedback indicating that the one or more forces were received as input to activate the one or more parameters.

4. The mobile device of claim 3, wherein the feedback is at least one of audible, tactile, or visible.

5. The mobile device of claim 1 wherein:
   the display screen is configured to display a notice of an incoming call on a portion of the display screen; and
   the one or more parameters include declining the incoming call if a force is detected as applied to the first edge of the display screen adjacent the notice.

6. The mobile device of claim 1, wherein the first parameter is acceptance of a wireless call, and the second parameter is declining of the wireless call.

7. The mobile device of claim 1, wherein at least one piezoelectric sensor of the one or more piezoelectric sensor is configured to activate either one parameter or another parameter based on different magnitudes of force applied to a location of the display screen.

8. The mobile device of claim 1, wherein the first edge and the second edge are side edges of the screen.

9. A method, comprising:
   providing an electrical signal from one or more piezoelectric sensors in response to one or more forces applied to a display screen of a mobile device, the mobile device having a housing with the display screen being moveable relative to the housing, the display screen having a first edge and a second edge that extend from the housing when the display screen is moved from a compact form factor to an expanded form factor, the one or more piezoelectric sensors including a first piezoelectric sensor disposed to detect a first force applied to the first edge of the display screen and a second piezoelectric sensor disposed to detect a second force applied to the second edge of the display screen; and
   activating one or more parameters of the mobile device based at least in part on the electrical signal from the one or more piezoelectric sensors, a first parameter of the one or more parameters configured to activate based on the first force detected by the first piezoelectric sensor, and a second parameter of the one or more parameters configured to activate based on the second force detected by the second piezoelectric sensor.

10. The method of claim 9, wherein the one or more parameters include at least one of volume, call acceptance, call decline, messaging, or a speaker mode.

11. The method of claim 10, further comprising providing feedback with the one or more piezoelectric sensors, the feedback being responsive to the one or more forces and indicating that the one or more forces were received as input to activate the one or more parameters.

12. The method of claim 11, wherein the feedback is at least one of audible, tactile, or visible.

13. The method of claim 10, further comprising:
   displaying a notice of an incoming call on a portion of the display screen; and
   declining the incoming call if a force is detected as applied to the first edge of the display screen adjacent the notice.

14. The method of claim 10, wherein the first parameter is acceptance of a wireless call, and the second parameter is declining of the wireless call.

15. The method of claim 10, wherein at least one piezoelectric sensor of the one or more piezoelectric sensor is configured to activate either one parameter or another parameter based on different magnitudes of force applied to a location of the display screen.

16. A system, comprising:
   a display screen moveable relative to a housing between one or more screen positions, at least one screen position of the display screen exposing one or more edges of the display screen, the one or more edges including a first edge and a second edge that extend from the housing;
   one or more piezoelectric sensors positioned relative to the display screen and configured to detect one or more forces applied to the one or more edges of the display screen, the one or more piezoelectric sensors including a first piezoelectric sensor disposed to detect a first force applied to the first edge of the display screen and a second piezoelectric sensor disposed to detect a second force applied to the second edge of the display screen; and
   a selection manager configured to activate one or more device parameters based at least in part on detecting the one or more forces applied to the display screen, a first parameter of the one or more parameters configured to activate based on the first force detected by the first piezoelectric sensor, and a second parameter of the one or more parameters configured to activate based on the second force detected by the second piezoelectric sensor.

17. The system of claim 16, wherein the one or more piezoelectric sensors provide feedback responsive to the one or more forces, the feedback indicating that the one or more forces were received as input to activate the one or more device parameters.

18. The system of claim 17, wherein the feedback is at least one of audible, tactile, or visible.

19. The system of claim 16, wherein the first parameter is acceptance of a wireless call, and the second parameter is declining of the wireless call.

20. The system of claim 16, wherein at least one piezoelectric sensor of the one or more piezoelectric sensor is configured to activate either one parameter or another parameter based on different magnitudes of force applied to a location of the display screen.

\* \* \* \* \*